(12) United States Patent
Miller et al.

(10) Patent No.: US 6,962,044 B1
(45) Date of Patent: *Nov. 8, 2005

(54) METHOD AND APPARATUS OF ASYMMETRIC INJECTION INTO SUBSONIC FLOW OF A HIGH ASPECT RATIO/COMPLEX GEOMETRY NOZZLE

(75) Inventors: Daniel N. Miller, Bainbridge Island, WA (US); Patrick J. Yagle, Fort Worth, TX (US); Kerry B. Ginn, Weatherford, TX (US); Jeffrey W. Hamstra, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/621,795

(22) Filed: Jul. 21, 2000

Related U.S. Application Data

(63) Continuation-in-part of application No. 08/906,731, filed on Aug. 5, 1997, now Pat. No. 6,112,512.

(51) Int. Cl.⁷ .............................. F02K 1/30; F02K 1/28
(52) U.S. Cl. .......................... 60/230; 60/231; 60/771; 239/265.17; 239/265.23
(58) Field of Search .................. 60/770, 771, 204, 60/230, 231, 271; 239/265.17, 265.19, 265.23

(56) References Cited

U.S. PATENT DOCUMENTS

| | | | |
|---|---|---|---|
| 2,952,123 A | * | 9/1960 | Rich |
| 3,132,476 A | * | 5/1964 | Conrad .......................... 60/231 |
| 3,144,752 A | | 8/1964 | Kepler ...................... 60/35.54 |
| 3,204,405 A | * | 9/1965 | Warren et al. ................. 60/231 |
| 3,285,262 A | * | 11/1966 | Ernst et al. .................... 60/231 |
| 3,294,323 A | * | 12/1966 | Ernst ....................... 239/265.23 |
| 3,318,532 A | | 5/1967 | Gaubatz |
| 3,374,954 A | | 3/1968 | Card .......................... 239/127.1 |
| 3,646,762 A | | 3/1972 | Hawk et al. ................... 60/204 |
| 3,698,642 A | | 10/1972 | McCullough ................ 239/265 |
| 3,737,103 A | * | 6/1973 | Howell et al. .......... 239/265.23 |
| 3,747,874 A | | 7/1973 | Johnsen ......................... 244/53 |
| 3,759,039 A | * | 9/1973 | Williams ...................... 60/231 |

(Continued)

OTHER PUBLICATIONS

AIAA 95–2603; Conceptual Development of Fixed–Geometry Nozzles Using Fluidic Injection for Throat Area Control; D.N. Miller, et al; Jul. 10, 1995; pp. 1–10.

AIAA 95–2604; A Static Investigation of Fixed–Geometry Nozzles Using Fluidic Injection for Throat Area Control; J.A. Catt, et al; Jul. 10, 1995; pp. 1–9.

AIAA 95–2605; Fuidic Control of Nozzle Flow—Some Performance Measurments; J. Federspiel, et al; Jul. 10, 1995; pp. 1–7.

*Primary Examiner*—Ted Kim
(74) *Attorney, Agent, or Firm*—Koesnter Bertani, LLP

(57) ABSTRACT

The present invention reveals a method and apparatus for controlling the effective area and thrust vector angle of a fluid flow. In one embodiment, the fluid flow is controlled in an advanced, high aspect ratio, complex aperture geometry nozzle using asymmetric injection into the subsonic portion of the fluid flow. The present invention vectors the primary flow by partially blocking the flow with an opposed flow across the flow field. A fluidic flow field is defined in a flow container that directs a pressurized, primary fluidic flow from the container towards an exit of the container. A nozzle may cooperate with the exit of the flow container to control the fluidic flow as it exits the flow container. One or more injectors associated with the container are proximate to the effect throat of the primary flow while other are located downstream of to introduce an opposing fluidic flow that interacts with the primary fluidic flow. A controller associated with the injectors directs the injectors to provide the opposing flow as needed to achieve a desired partial blockage of the primary flow, thereby vectoring the primary flow.

25 Claims, 9 Drawing Sheets

U.S. PATENT DOCUMENTS

| | | | |
|---|---|---|---|
| 4,063,685 A | 12/1977 | Jacobs | 239/265 |
| 4,351,479 A | 9/1982 | Kranz et al. | 239/265 |
| 4,686,824 A | 8/1987 | Dunaway et al. | 60/231 |
| 5,406,787 A | 4/1995 | Terrier | 60/204 |
| 5,437,412 A * | 8/1995 | Carletti | 239/265.35 |
| 5,664,415 A * | 9/1997 | Terrier | 60/231 |
| 5,706,650 A * | 1/1998 | Thayer | 60/231 |
| 5,996,936 A * | 12/1999 | Mueller | 239/265.23 |
| 6,000,635 A * | 12/1999 | Justice | 239/265.33 |
| 6,070,830 A * | 6/2000 | Mueller et al. | 239/265.39 |
| 6,112,512 A * | 9/2000 | Miller et al. | 60/231 |
| 6,112,513 A * | 9/2000 | Catt et al. | 60/231 |

* cited by examiner

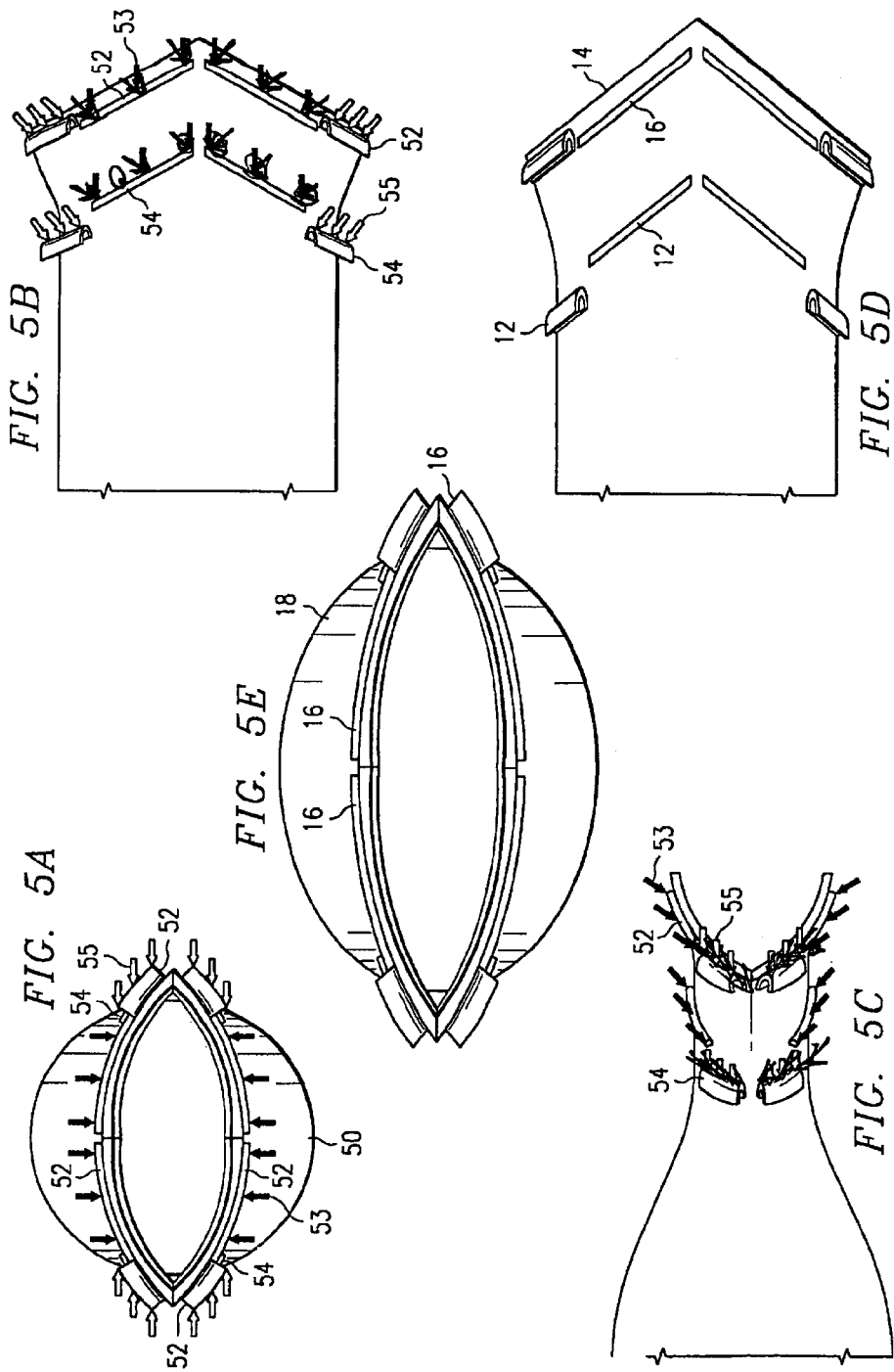

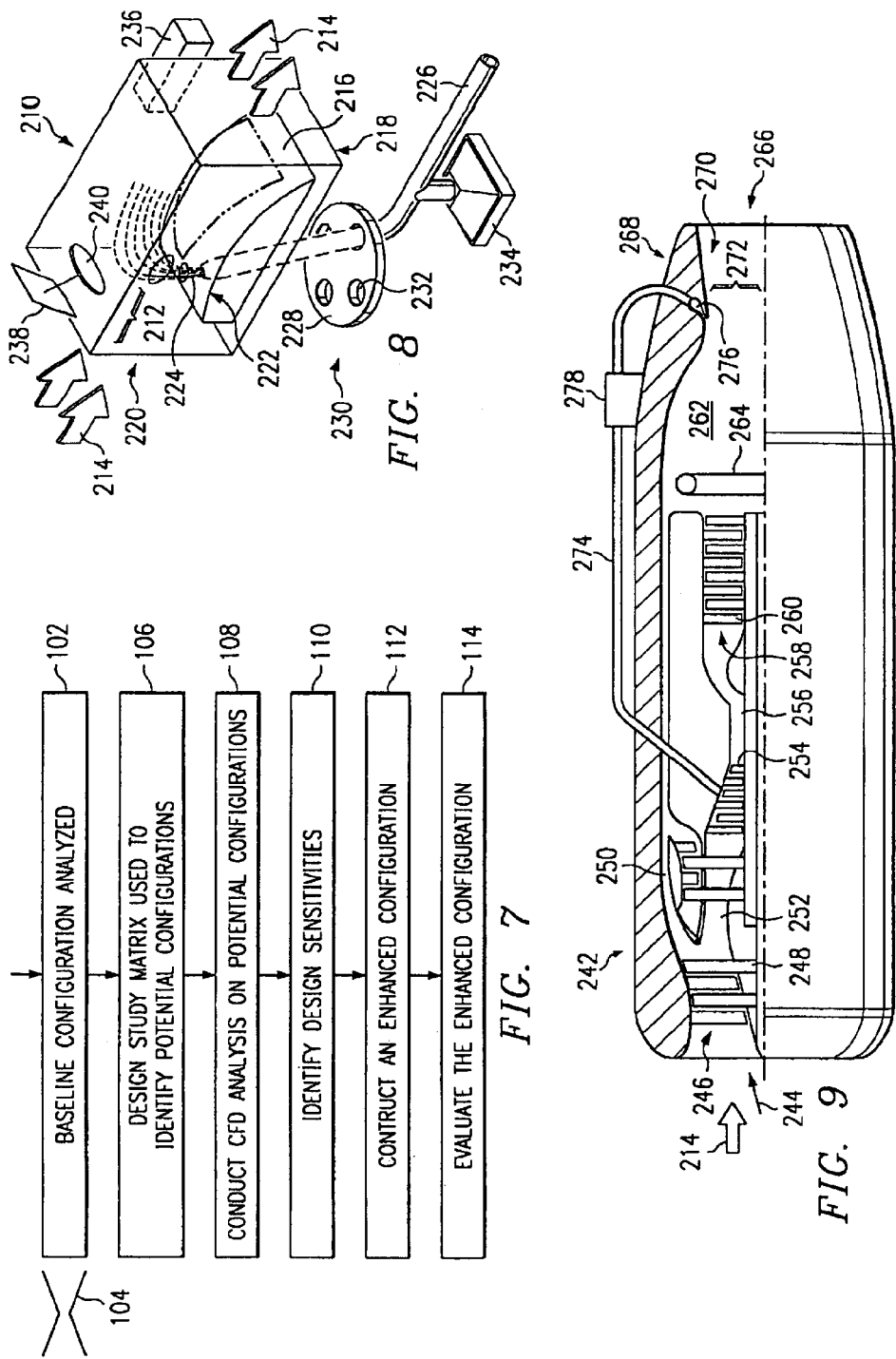

METHOD AND APPARATUS OF ASYMMETRIC INJECTION INTO SUBSONIC FLOW OF A HIGH ASPECT RATIO/COMPLEX GEOMETRY NOZZLE

RELATED APPLICATIONS

This application claims the benefit of U.S. patent application Ser. No. 08/906,731 filed on Aug. 5, 1997, now U.S. Pat. No. 6,112,512, entitled "Method and Apparatus of Pulsed Injection for Improved Nozzle Flow Control." Additionally, this application claims priority to and repeats a substantial portion of prior application entitled "Method and Apparatus of Pulsed Injection for Improved Nozzle Flow Control" filed on Aug. 5, 1997 which was accorded Ser. No. 08/906,731. Since this application names the inventor named in the prior application, the application constitutes a continuation in part of the prior application. This application incorporates by reference prior U.S. patent application Ser. No. 08/906,731 filed on Aug. 5, 1997, now U.S. Pat. No. 6,112,512, entitled "Method and Apparatus/of Pulsed Injection for Improved Nozzle Flow Control" and U.S. patent application Ser. No. 08/906,768 filed on Aug. 5, 1997, now U.S. Pat. No. 6,112,513, entitled "Method and Apparatus of Asymmetric Injection at the Subsonic Portion of a Nozzle Flow" which is herein incorporated by reference.

TECHNICAL FIELD OF THE INVENTION

This invention relates in general to the field of nozzles for controlling a fluid flow, and more particularly, to a nozzle for throttling and vectoring a fluid flow, such as the exhaust flow exiting a jet engine, through the throat of the nozzle by varying the effective cross-sectional area of the throat with the injection of a steady, unsteady, or pulsed secondary flow.

BACKGROUND OF THE INVENTION

Jet engines create thrust by directing a high energy exhaust stream from an exhaust nozzle. Typically, a jet engine accepts air through an inlet and compresses the air in a compressor section. The compressed air is directed to a combustion chamber, mixed with fuel, and burned. Energy released from the burning fuel creates a high temperature in the combustion chamber. The hot, high-pressure air passes through a turbine section and into an exhaust chamber. The high pressure air is then forced from the exhaust chamber through a nozzle, where the air exits the engine. Typically, as the air passes through the throat of the nozzle, it expands and accelerates from subsonic to supersonic speeds, essentially translating the energy of the exhaust flow from a pressure into a velocity. The energy level of the air in the exhaust chamber generally relates to the velocity of the air as it exits the nozzle. The greater the velocity of a given mass flow of air exiting an engine, the greater the thrust created by the engine.

Military aircraft commonly augment the energy level of the air in the exhaust chamber by using an afterburner. Afterburners add fuel to the exhaust chamber and ignite the fuel in the exhaust chamber, which increases the temperature of the exhaust flow. Although the energy added by afterburned fuel can greatly increase the thrust of the engine, the reduced density of the hotter air requires a larger nozzle effective throat area. Failure to increase nozzle effective area during afterburning with a typical jet engine can cause excessive back pressure in the compressor section and turbine section, causing the engine to stall.

To alleviate these difficulties, jet engines with afterburners typically use variable geometry nozzles to throttle the exhaust flow from the exhaust chamber. When afterburner is initiated, the circumference of the nozzle's throat is increased to increase the cross-sectional flow area through the throat. This increased cross-sectional area allows air to more easily escape from the exhaust chamber. Modern afterburning jet engines with variable geometry nozzles can require as much as a two-old increase in cross-sectional throat area to maintain constant engine flow and back pressure in response to the extra thermal energy added by afterburning.

Although variable geometry nozzles allow the use of afterburner, they also have many inherent disadvantages which penalize aircraft performance. For instance, a variable geometry nozzle can make up a significant portion of the weight of an engine. Such nozzles are typically made of large, heavy metal flaps which mechanically alter nozzle geometry by diverting exhaust low with physical blockage, and thus have to endure the high temperatures and pressures associated with exhaust gases. In the iris-type nozzles typically used on afterburner-equipped engines, the actuators used to adjust the nozzle flaps to appropriate positions in the exhaust flow tend to be heavy, expensive and complex because of the forces presented by the exhaust flow which the nozzle flaps must overcome. Further, the nozzle flaps typically constrict the exhaust flow by closing and overlapping each other, which allows hot air to escape between the flaps. These leaks cause reductions in thrust. Variable geometry nozzles are also difficult to implement on exotic nozzle aperture shapes typical of advanced tactical fighter aircraft.

Attempts to reduce the disadvantages of variable geometry nozzles have had limited success. The state-of-the-art tactical aircraft is the Lockheed F-22 Raptor. The Raptor employs a two-dimensional variable geometry nozzle that can vector or turn the exhaust flow of the Raptor's engine to provide directional thrust control. Although the two-dimensional nozzle flaps of the Raptor provide better infrared and radar cross section characteristics than can be obtained from typical iris-type nozzles, even the Raptor's advanced system suffers from the above-mentioned disadvantages. For instance, air can leak along the intersection of the two-dimensional nozzle flaps, introducing inefficiency.

Attempts to use a fixed geometry nozzle with afterburning engines have met with only limited success due to the difficulty of maintaining flow through the engine when an overpressure is created by afterburner initiation. For instance, U.S. Pat. No. 5,406,787 issued to Terrier uses an additional compression stage to vary pressure during engine operation and afterburning to counteract temperature variations created by the afterburner in the exhaust chamber. However, this system requires modification to the engine and other complexities such as a control program to monitor and adjust pressure produced by the compression section.

Another method for using a fixed geometry nozzle with a jet engine is to inject a secondary flow of high pressure air across the primary flow as the primary flow passes through the nozzle, as is explained in "Conceptual Development of Fixed-Geometry Nozzles Using Fluidic Injection for Throat Area Control" AIAA-95-2603 and "A Static Investigation of Fixed-Geometry Nozzles Using Fluidic Injection for Throat Area Control" by J. A. Catt and D. N. Miller, AIAA-95-2604, July 1995. The secondary flow can partially block the exhaust exiting through the nozzle to decrease the flow through the nozzle when needed to increase the pressure within the exhaust chamber. When an overpressure exists in the exhaust chamber, the secondary flow can be reduced or eliminated to increase the flow through the nozzle.

Although the injection of a secondary flow will support a fixed geometry nozzle in an afterburning jet engine, this method also introduces inefficiencies to the engine's operation. For instance, the amount of afterburning may be limited due to the lower effectiveness of secondary injection compared to the effectiveness of variable geometry nozzles. Also, injection of air across the flow of the exhaust tends to use a large amount of high pressure air to obtain effective nozzle blockage. Thus, injection can introduce inefficiency because the total momentum of the exhaust flow is decreased by the decreased flow from the compressor section into the combustion section if compressed air is bled from the compressor section for injection. This inefficiency can result in a reduced range of operations for a given fuel supply and a fuel flow.

SUMMARY OF THE INVENTION

Therefore, a need has arisen for a method and apparatus that efficiently controls the flow through a nozzle by introducing a secondary fluidic flow to the flow field through the nozzle, the secondary flow providing a maximum amount of blockage to the flow field through the nozzle with a minimal injection mass flow. In accordance with the present invention, a steady, unsteady or pulsed flow is injected proximate to a nozzle opening and across the flow field to substantially eliminate or reduce disadvantages and problems associated with previously developed variable geometry and fixed geometry nozzles.

A method and apparatus are provided for throttling and vectoring the primary jet nozzle by partially blocking the nozzle with a steady, unsteady or pulsed flow across the flow field through the opening of the nozzle. A fluidic flow field is defined in a flow container that directs a pressurized, fluidic flow from the container towards an exit of the container. A nozzle cooperates with the exit of the flow container to control the fluidic flow as it exits the flow container. One or more injectors associated with the nozzle proximate to the nozzle's throat and downstream of the throat can introduce a steady, unsteady or pulsed fluidic flow that interacts with the primary fluidic flow. A controller associated with the injectors directs the injectors to provide the steady, unsteady or pulsed fluidic flow having a predetermined frequency, amplitude or waveform, as needed to achieve a desired partial blockage of the nozzle, thereby skewing the sonic plane of the nozzle and vectoring the jet. The controller can select a frequency, amplitude or waveform for the pulsed secondary flow so that the effective cross sectional area of the nozzle adjusts the pressure within the flow container to predetermined values by controlling or throttling the mass flow characteristics of the primary flow through the nozzle, including the primary flow's mass, velocity, pressure, temperature and density.

More specifically, in one embodiment, a fixed geometry nozzle is coupled to the exhaust chamber of a jet engine. The nozzle has a throat leading to a divergent area, the divergent area having a low expansion ratio. A plurality of injectors, each of which can be formed as a slot, are incorporated proximate to the throat of the nozzle, and downstream of the throat and directionally opposed to the subsonic portion of the exhaust flow through the engine. Each injector is oriented to direct injected flow into the flow field of the exhaust gas through the nozzle to optimize throttling or vectoring of the primary fluid flow. For instance, an injector can inject a pulse of fluid at an upstream angle relative to the flow field, such as an angle between zero and thirty degrees opposed to the primary flow, which travels along a longitudinal axis through the nozzle. Opposing injectors or slots injecting similar opposing flows can provide symmetric blockage of the nozzle's opening to reduce nozzle effective throat area and control the primary flow through the nozzle without changing the vector angle of the primary flow, thus throttling the engine. Injection of a secondary flow from a single injector can provide an asymmetric blockage of the nozzle's opening to change the vector angle of the primary flow. An asymmetric secondary flow from opposing injectors can provide both throttling and vectoring of the primary flow.

A source of high pressure air is provided to each injector, either from the compression section of the engine or from another convenient source, such as a separate compressor. The high pressure air is injected into the flow field in pulses by either a mechanical valve or an acoustic vibrator, such as a piezoelectric device. The frequency, amplitude and waveform of the pulse varies according to the amount of blockage desired at the nozzle. In one embodiment, each injector may rotate relative to the nozzle to provide asecondary flow at different angles relative to the flow field. In another embodiment, the injected flow can include fuel which can be ignited to enhance blockage of the flow field. In another embodiment, the flow field from the engine can be vectored or redirected by applying asymmetric injection at the nozzle. Asymmetric injection can be provided by injecting different mass flow rates from each of a plurality of injectors, or by altering the pulse frequency, amplitude or waveform at each such injector. Similarly, asymmetry can be imposed by using different injection angles or different fuel flows for each injector.

The present invention provides many technical advantages over previously developed apparatus and methods for controlling a flow through a nozzle to allow throttling of an engine or vectoring of an engine's thrust. Pulsed injection, when used instead of or in combination with a variable geometry nozzle, can reduce the weight, cost, and complexity of a nozzle. A pulsed injection system reduces the weight of a nozzle by eliminating or limiting the need for durable heavy moving parts such as hinges, seals, actuators, hydraulics and other mechanical items necessary to open and close the typical iris type variable geometry nozzle.

Another technical advantage of the present invention is that an aircraft equipped with an engine and fixed-geometry nozzle using pulsed injection can be implemented to non-circular exhaust aperture shapes typical of advanced fighter concepts. These aperture shapes, such as elliptical or diamond shapes, allow for better blending and integration into the aircraft aft body structure than typical iris-type nozzles.

Another technical advantage of the present invention, particularly when a fixed geometry nozzle is used, is that alternative materials can be used for the nozzle structure with an eye towards thermal rather than mechanical constraints. For instance, ceramic materials can form a fixed nozzle supported directly by the structure of the aircraft. Such ceramic materials can provide a heavy duty heat resistance nozzle structure with much improved durability compared to conventional metal and carbon materials. The reduced complexity of such a fixed nozzle system will reduce the cost of operating and maintaining the aircraft and can increase the efficiency of operating the aircraft due to the significantly reduced weight of such a system. Further, a nozzle incorporated with the aircraft's structure can be shaped to minimize drag, thus increasing the aircraft's efficiency and range.

Another technical advantage of the present invention is that an asymmetric secondary flow can provide vectoring of an engine's thrust. Thrust vectoring can allow aircraft control of pitch and yaw at all flying speeds, and can decrease the surface area of control surfaces, resulting in reduced aircraft drag and weight.

Another technical advantage of the present invention is that a fixed geometry nozzle can provide a combination of throttling and vectoring functions. Opposing injectors can provide throttling with nozzle blockage according to their combined mass flow and pulsing characteristics while also providing vectoring by varying the distribution of the total secondary flow between the injectors.

The pulsed injection system of the present invention offers additional technical advantages over previously developed injection techniques. Pulsed or unsteady injection of a fluidic secondary flow can provide improved penetration into the fluidic flow compared to the penetration provided by steady state injection. This increased penetration enhances the blockage of the nozzle opening without increasing the time averaged mass flow of the injected secondary flow. Thus, the effective cross sectional area of a nozzle and its vectoring angle can be controlled with less overall fluidic secondary flow injection. This increases the efficiency of the engine since less compressed air is needed by a pulsed secondary flow compared to a steady state secondary flow, and also decreases the size of the ducts needed to provide air to the injectors.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIGS. 1A–1D depict one embodiment of the present invention;

FIGS. 5A–5E provide an additional depiction of an embodiment of the present invention with preferred injector design vector angles;

FIG. 7 depicts a flow diagram for the development process associated with the present invention ;

FIG. 8 depicts an experimental apparatus for pulsed injection nozzle flow control;

FIG. 9 depicts a side sectional view of jet engine equipped with pulsed injection nozzle flow control;

DETAILED DESCRIPTION OF THE INVENTION

Figure 1A:
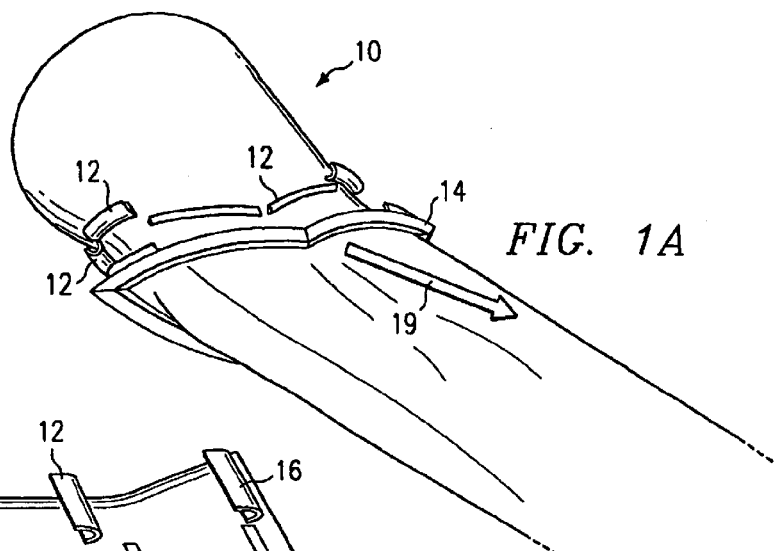

Preferred embodiments of the present invention are illustrated in the FIGUREs, like numerals being used to refer to like and corresponding parts of the various drawings.

The present invention reveals a method and apparatus for controlling the effective area and thrust vector angle of a fluid flow. In one embodiment, the fluid flow is controlled in an advanced, high aspect ratio, complex aperture geometry nozzle using asymmetric injection into the subsonic portion of the fluid flow.

Fluidics alter the mass flow and direction of a main fluid stream, or primary fluid flow, by the introduction of small control jets. Small disturbances created by injectors at points along the primary fluid flow produce large responses in the main stream. Fluidic injection is used to provide internal flowpath shape variation for jet control in nozzles and holds the promise of reducing the weight and complexity of future exhaust systems by eliminating mechanical flowpath actuation. By introducing an injector into the exhaust stream near the throat or exit, the injector plume can produce a stable fluidic obstruction. By metering injector flow, the size of the obstruction, and hence, the internal flowpath shape can be actively modified to control both jet area and thrust vector angle. In one embodiment of the present invention, the walls of a structure containing the primary flow can take unconventional shapes and injectors can be used to manipulate effective sonic planes for throttling, controlling, and vectoring the primary flow. These shapes are not limited by mechanization concerns as are conventional variable geometry nozzles. Thus allowing the structure to be optimized for non-fluidic concerns such as observability (radar and IR signatures) and material composition.

while functionally easy to describe, fluidics' performance is dictated by complex interactions among approximately two dozen geometric and fluid properties.

In the propulsion area of high performance aircraft, the multi-function exhaust nozzles may account for 30 percent of the total engine weight. Weight is reduced or eliminated by removing the actuation systems and moving surfaces associated with variable geometry exhaust systems. Fluidics allow this without losing afterburning or thrust vectoring functionality.

Eliminating moving parts reduces parts count, increases reliability, and potentially removes 30 to 50 percent from the exhaust system cost. In addition, a fixed nozzle can be easily shaped for reduced drag and signature, with the latter yielding significant stealth benefits.

Furthermore, fixed nozzles can be fabricated from a wider range of materials. This allows one of the most replaced items on fighter aircraft, the nozzle internal flap (the area between the exhaust nozzle throat and exit) to be designed based on thermal rather than mechanical constraints.

Turbofan engine features, such as thrust vectoring and afterburning, require complex controls for manipulating exhaust angle and exhaust nozzle geometry. During afterburning, fuel is sprayed directly into the exhaust duct. Afterburning dramatically increases thrust as well as exhaust temperature. To maintain constant flow and backpressure, the exhaust nozzle throat area must increase 50 to 100 percent over its normal cruise operation size.

This thrust vectoring and afterburning control system is a complex mechanical maze of hundreds of parts—hinges, seals, hydraulic actuators, bearings, flaps, etc.—that must slide, pivot, extend, and retract while maintaining tight tolerances under extreme temperature and pressure variations.

In a fluidic nozzle, effective throat area is controlled via small injectors symmetrically located around the nozzle throat. Depending on the configuration, injection angle, flow rate and pressure, these injectors can throttle the main exhaust stream as much as 50 percent between afterburning and normal cruise operation.

Thrust vectoring is a technique for turning an aircraft by diverting the exhaust stream using movable flaps or paddles.

In fluidic thrust vectoring, a second set of injectors is located around the nozzle flap, but the injectors are individually activated, as needed, to skew the sonic plane, the section of the exhaust where the flow reaches a speed of Mach 1.

Control flows for throttling and vectoring may be bled from the compressor stage or some other high-pressure source in the engine.

The present invention represents an improvement over known prior art systems through the implementation of asymmetric injection in non-axisymmetric-aperture shaped nozzle (trapezoidal, biconvex, triangular) with a flow path width greater than its height. Additionally, these nozzles may possess curved or straight flow path walls wherein corners made by any two sidewalls are not perpendicular and contain a swept or non-swept trailing edge. The nozzle on the present invention has multiple injectors proximate to the throat of the nozzle and/or proximate to the nozzle flap. These injectors are used to vary the throat area (sonic plane) and/or vector angle of the fluid flow. Dedicated sets of these injectors can be arrayed around the periphery of the nozzle to achieve throttling and vectoring in pitch and/or yaw planes. This is illustrated in FIGS. 1A–1C.

Figure 1B:
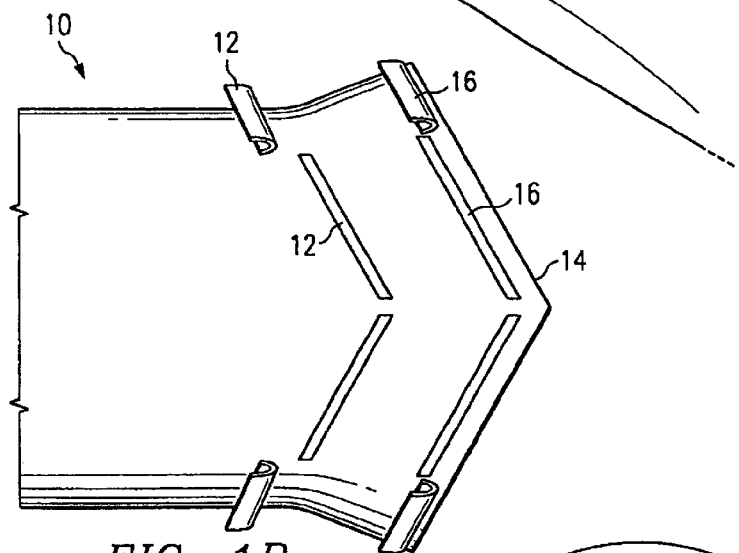
Figure 1C:
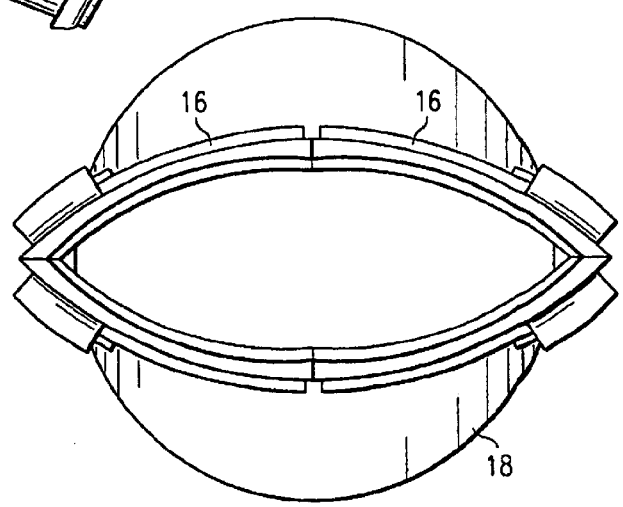

FIG. 1A is an isometric depiction of a high aspect ratio biconvex aperture nozzle with injection ports for multi-axis thrust vectoring. FIG. 1B presents a plan view of high aspect ratio aperture nozzle 10 illustrating injector ports 12, 14, 16 and 18. Throat slots 12 and 16 serve as injector ports proximate to the throat of the nozzle and flap slots 14 and 18 serve as injector ports proximate to the nozzle flap. FIG. 1C illustrates two additional sets of injectors yaw slots 16 and 18 and pitch slots 12 and 14. These dedicated sets of injectors 12, 14, 16 and 18 can be arrayed around the periphery of nozzle 10 to achieve vectoring in pitch and/or yaw vector planes as is shown in FIG. 1A by thrust vector 19. The injector slots or pitch slots 12 and 14 shown in FIG. 1C are located on the top and bottom surfaces of nozzle 10 and are intended to provide pitch plane vectoring. While those injectors such as yaw slots 16 and 18 located on the sidewalls are intended for yaw plane vectoring. Slots 12, 14, 16 and 18 can be swept at an angle similar to that of the exit plane trailing edge. Such injectors direct injected flow having vector components, $I_x$, $I_y$, and $I_z$, opposed to that of the primary flow vector $V_{pf}$ in the intended vectoring plane, yz for pitch or xz for yaw of FIG. 1D with the special cases of a zero sum x component for pitch or zero sum y component for yaw.

FIG. 1D illustrates two instances where the primary flow vector $V_{pf}$ is shifted in the pitch (yz) or yaw (xz) plane. In both instances, $V_{pf}$ which lays along the primary flow (z) axis, swings to an intended vector $V_i$ by injecting flow to oppose $V_{pf}$ having vector components $I_{xl}$, $I_{yl}$ and $I_{zl}$. In the instance of pitch, $I_{xl}$ is zero while instance of yaw, $I_{yl}$ is zero. Additional injectors are represented by an injected flow having vector components $I_{xn}$, $I_{yn}$ and $I_{zn}$. When additional injectors are present, a pure rotation of the $V_{pf}$ in the pitch (yz) plane requires that the net effect of $\Sigma_1^n I_{xn}$ on $V_{pf}$ is zero.

Figure 2A:
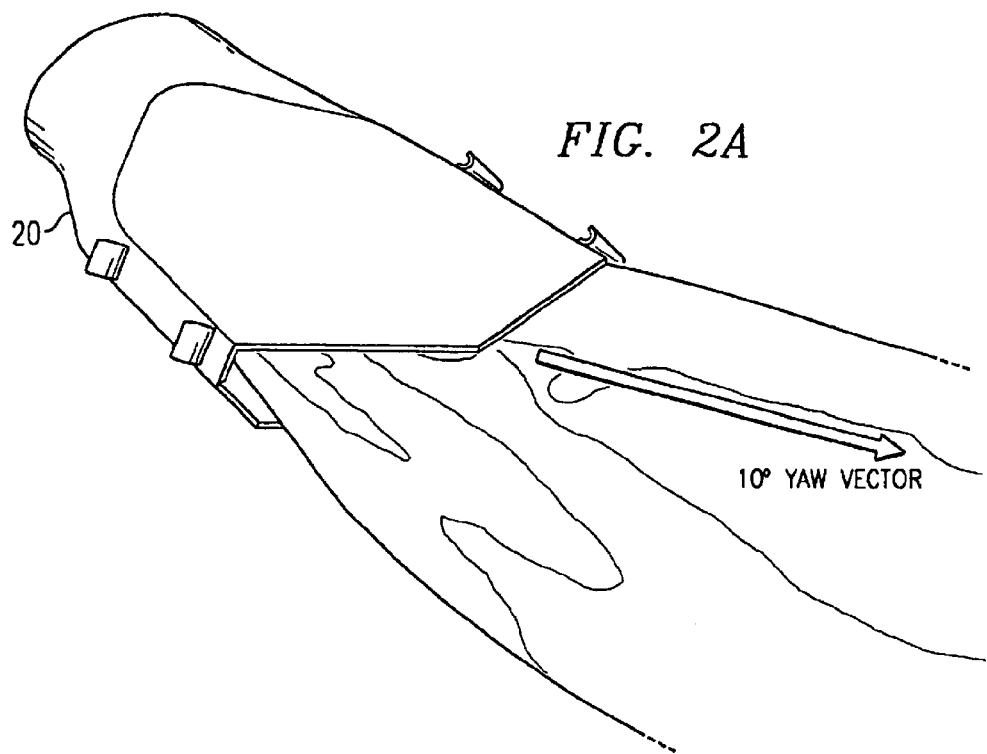
FIGS. 2A and 2B provide An ultra high aspect ratio nozzle of the present invention.
Figure 2B:
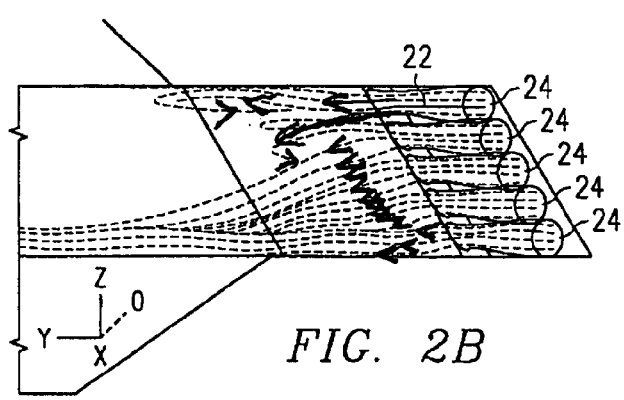

To direct the injector flow at such angles a multi-hole array of injectors, as is shown in FIG. 2B, having a central axis aligned to provide the aforementioned angles can be used in place of injector slots.

FIG. 2A presents an ultra high aspect ratio (10:1) trapezoid aperture nozzle with injection ports for yaw thrust vectoring. FIG. 2B illustrates an array 22 comprising several individual injector ports 24. The throat plane can be varied and inclined to vector fluid flow using only the set of injectors proximate to the throat, the set of injectors proximate to the flap, or using a combination of both sets of injectors.

Figure 3A:
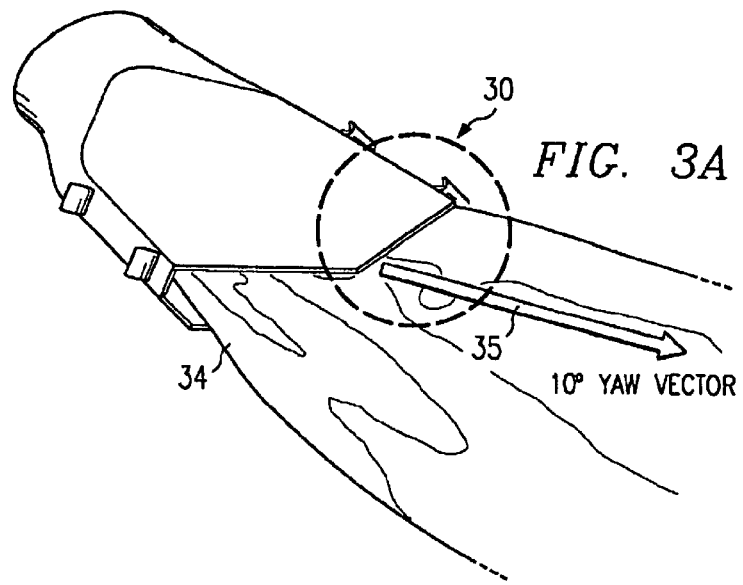
FIGS. 3A–3E provide a more detailed depiction of an ultra high aspect ratio nozzle of the present invention.
Figure 3B:
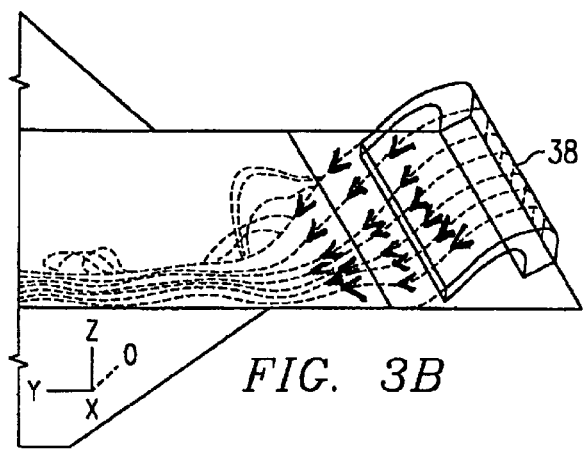
Figure 3C:
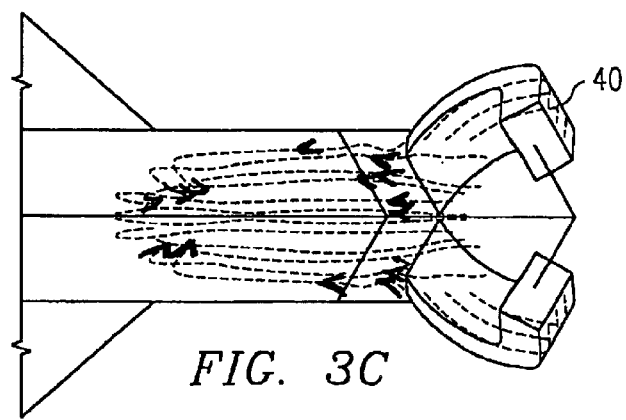
Figure 3D:
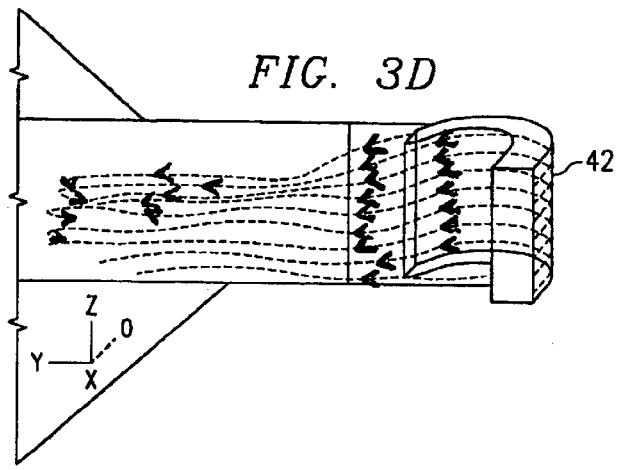
Figure 3E:
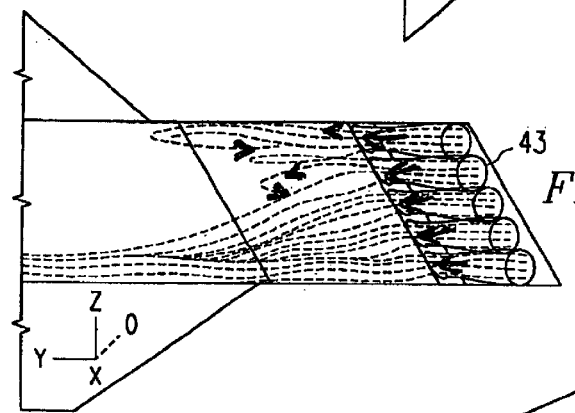

FIG. 3A presents a more detailed depiction of an ultra high aspect ratio trapezoid aperture nozzle 30 having injector ports 32 for yaw thrust vectoring. FIG. 3A presents an isometric view of nozzle 30 with exiting primary flow 34 wherein exiting primary flow 34 is vectored at a 10 degree yaw vector angle 36. FIG. 3B illustrates an array of slot flap injectors 38 in a trapezoidal aperture nozzle. An alternative embodiment is presented in FIG. 3C wherein the flap injectors 40 are incorporated into a hexagonal aperture nozzle. Yet another type of slot injector is presented in FIG. 3D having an array of slot injectors 42 incorporated into a rectangular aperture nozzle. Yet another embodiment of flap injectors is presented in FIG. 3E where an array of round jet flap injectors 43 are incorporated into a trapezoidal aperture flap nozzle. These different shapes can be chosen in order to minimize observable characteristics such as radar return.

Figure 4A:
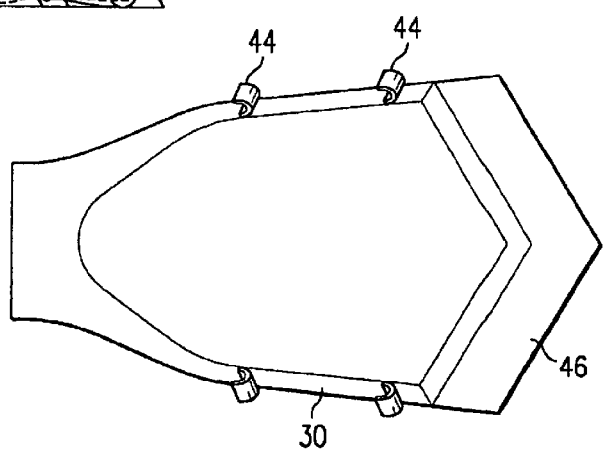
FIGS. 4A and 4B depict a nozzle with an arrowhead shaped trailing edge.
Figure 4B:
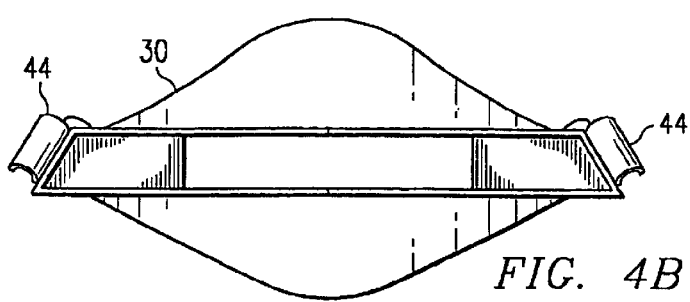

FIG. 4A presents a plan view of nozzle 30 having two fluidic injection ports 44 per side. The nozzle in this case has a 30° trailing edge sweep 46. A rear view of nozzle 30 is provided in FIG. 4B.

FIGS. 5A–5E provide an additional depiction of an embodiment of the present invention. FIGS. 5A–5E depict various aspects of a high aspect ratio biconvex aperture nozzle 50 with injection ports for multi-axis thrust vectoring. FIG. 5A presents a rear view (xy plane) of biconvex aperture nozzle 50. Injector slots 52 are used to control the pitch angle of nozzle jet 50 while injector slots 54 are used to control the yaw angle of nozzle 50. FIG. 5B presents a top down (xz plane) or plan view of the biconvex aperture nozzle 50. FIG. 5C presents a side view (yz plane) of this biconvex aperture nozzle 50. The yaw and pitch injector slots 52 and 54 are further broken down into throat slots and flap slots as illustrated in the plan view provided in FIG. 5D. Vectors 55 and 53, where vectors 53 are associated with pitch injector slots and vectors 55 are associated with yaw injector slots, illustrate that control of the primary fluid flow 56 is best achieved when the injector slots direct the injected flow in opposition to the primary flow in the intended vectoring plane as illustrated in FIGS. 5A–5C. FIGS. 5D and 5E again present the throat slots and flap slots associated with the biconvex aperture nozzle 50 and provide a plan view in FIG. 5D and a rear view in FIG. 5E.

Figure 6:
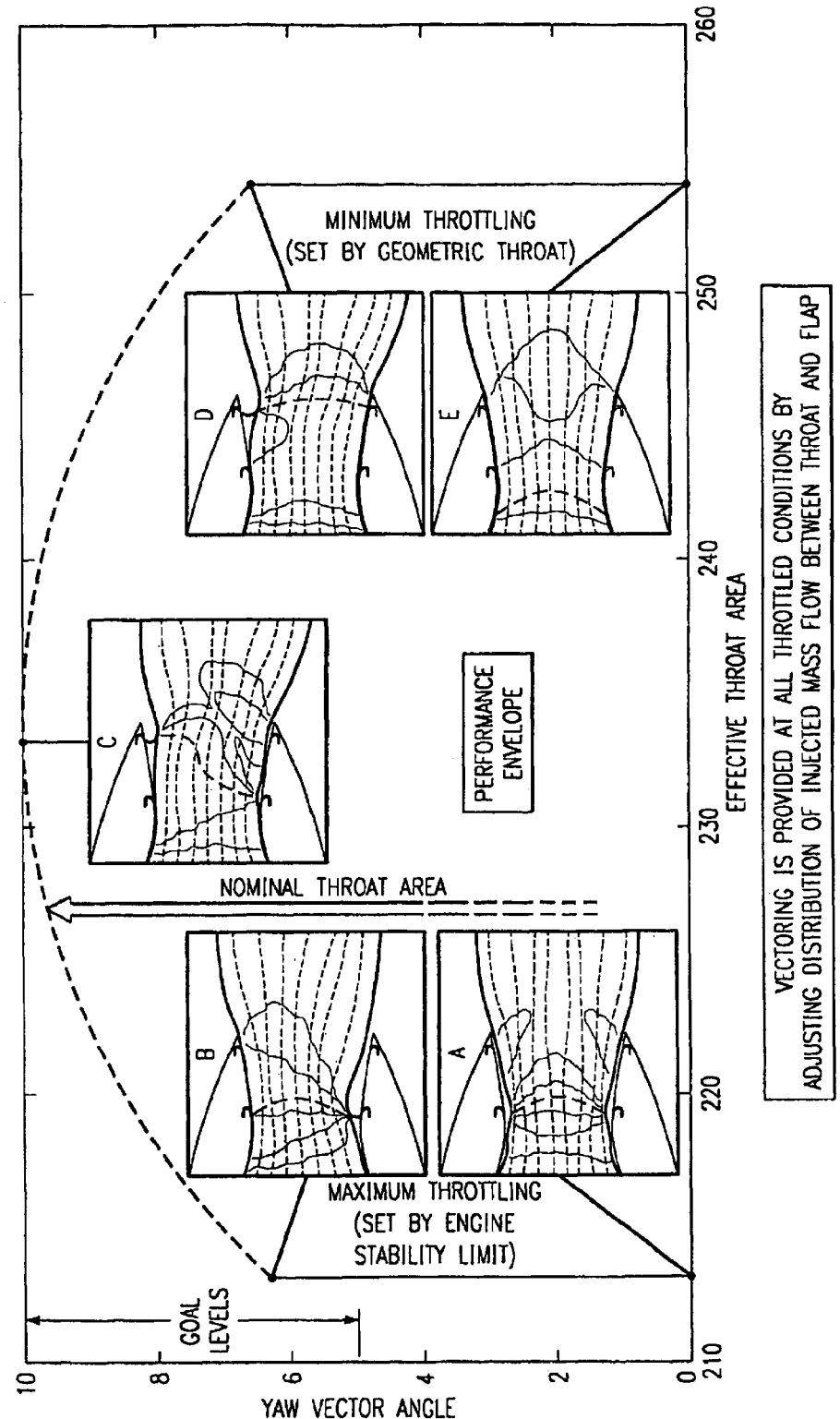
FIG. 6 illustrates the performance envelope of a fluidically controlled nozzle.

CFD solutions can be used to understand the effects of the high aspect ratio aperture shape on the fluidic throat skewing process. For example, with the high aspect ratio nozzle 10 provided in FIGS. 1A–1C CFD solutions predict a 13 to 14 degree yaw vector angle potential for this configuration at design conditions. FIG. 6 illustrates the performance envelope for fluidic throat skewing for the selected configuration of design conditions. This graph indicates the performance envelope of yaw vector angle versus effective throat area.

Using computational fluid dynamics (CFD) and design of experiments (DOE) software, the cost and time required to develop a fluidic nozzle is greatly reduced. The advantage of the fluidic nozzle is dramatically reduced weight and cost in high-performance military aircraft.

Fluidic nozzle performance depends on parameters such as injector location, shape, size, and flow rate; nozzle flap length; and injector flow pressure. To investigate eight parameters with three levels each would require $3^8$ or 6,561 experiments, to handle all the possible combinations.

Design of experiments uses regression analysis to identify statistically significant subsets of the full factorial. There is some sacrifice in accuracy, but the results usually trend in the right direction.

A major advantage of DOE is that it allows all the parameters to vary simultaneously. A single permutation, on the other hand, varies one parameter at a time and cannot deal with interactions among the fixed parameters.

DOE starts with a prescreening exercise and a baseline configuration. The baseline will not meet all the design criteria. If it did, the analysis wouldn't be necessary in the first place.

A figure of merit is established for comparing results. For fluidic nozzle throttling, the figure of merit is the nozzle discharge coefficient, which directly correlates to effective throat area. For thrust vectoring, the figure of merit is Primarily jet thrust vector angle and gross thrust coefficient.

The prescreening exercise is much like a typical analysis. Design parameters are varied one at a time to determine which have the greatest effect on the figure of merit. CFD may be used for the screening.

A CAD model of each nozzle/injector shape is constructed. The models may be initially evaluated using two-dimensional CFD analysis. If the results are favorable, then the more time-consuming three-dimensional CFD calculation is performed.

Based on CFD results, the design parameters are reduced to the three or four that produced the greatest response, and multiple levels are assigned to each parameter.

Even with only four variables and three levels for each one, a full permutation is $3^4$, or 81 experiments.

The subset combinations are processed first through 2-D CFD to eliminate unlikely candidates and then further analyzed with 3-D. These results are post-processed with DOE to develop design sensitivities. For instance, a parameter could be longer or shorter, higher or lower, to improve response. Knowing this information, the researcher can develop an optional model, the parameter combination expected to deliver the best performance. This model is then verified by CFD to ensure that DOE has indeed, produced an optimal combination. If this combination passes the analytical test, the design is ready for wind tunnel testing.

For nozzle discharge coefficient and thrust efficiency, the CFD results are typically within 1 and 2 percent of the physical experiments' results, while vectoring effectiveness has been within 1 and 2 degrees.

One embodiment of the present invention uses CFD analysis relying on Reynolds-averaged Navier-Stokes code that can use an approximate lower-upper implicit solver.

This allows boundary conditions inside the grid, an important feature when looking at an injector port that sits inside the grid. The CFD analysis may also allow the problem to be cut into multiple parts so that the pieces can be run in parallel on multiple computer processors.

Calculating these complex CFD problems, some with almost two million grid points, demands substantial computing power. For one million grid points or fewer, a computer such as the Silicon Graphics Octane, a high-performance Unix-based graphics workstation with multiple RISC processors and one gigabyte of RAM or other system known to those skilled in the art, is required for CFD analysis. For larger problems, a super computer such as an HP V-class can be used.

Design of experiments slashes the number of analytical experiments, and computational fluid dynamics eliminates innumerable wind tunnel tests. A typical wind tunnel test alone costs $250,000 to $500,000. Military aircraft often have a 10- to 15-year development cycles. The techniques of the present invention cut millions of dollars from development costs, a fact that has made the development work economically feasible.

FIG. 7 illustrates the design process for fluidic throat skewing using both computational fluid dynamics (CFD) and a design of experiments (DOE) approach. In step 102 the baseline configuration is analyzed of nozzle 104. The design variables are identified such as R1, H, $L_F$, $X_{IFLAP}$, $\alpha_{IFLAP}$, and the nozzle throat height. Some of the design variables to be selected may include the divergent flap length, the flap injector location, flap injector angle, expansion area ratio, injector mass flow split, total injector mass flow, injector slot distribution, nozzle pressure ratio, convergence rate, aperture shape, aperture aspect ratio, trailing edge angle and trailing edge type. A design study matrix comprising the different design variables and settings is used to reduce the number of configurations to be studied in step 106.

CFD analysis on the different DOE configurations identified in step 106 are performed to determine different design sensitivities such as those described in step 108.

The detected design sensitivities, illustrated at step 110, in one embodiment indicate a relationship between yaw vector angle and the ratio of $L_F/H_8$.

An enhanced configuration is constructed in step 112 with the appropriate values of design variables selected from the prior experiments.

In step 112, this configuration is evaluated with a static thrust stand test. One embodiment of the present invention selected according to the design process illustrated in FIG. 7 is contained in table 1.

| Design Variable | 'Optimum' |
| --- | --- |
| Divergent Flap Length | 12 * $h_{thr}$ |
| Flap Injector Location | 0.8 * $L_f$ |
| Flap injector Angle | 30° opposed |
| Expansion Area Ratio | 1.3 |
| Injector Mass Flow Split | Variable for throttling and vectoring |
| Total Injector Mass Flow | 5% |
| Injector Slot Distribution | Dedicated |
| Nozzle Pressure Ratio | 2 < NPR < 9 |
| Aperture Shape | Biconvex |
| Aperture Aspect Ratio | (a/b) = 2.5 |
| Trailing-Edge Angle | 30° |
| Trailing-Edge Type | Arrowhead |

Referring now to FIG. 8, an experimental apparatus for determining the effectiveness of pulsed injection is depicted. A flow container 210 having a rectangular shape defines a flow field 212 which contains a fluidic flow 214. Fluidic flow 214 passes over a nozzle contour 216 and leaves flow container 210 at container exit 218. Nozzle contour 216 cooperates with flow container 210 to form a nozzle 220. The cross sectional area of the opening of nozzle 220 varies along the longitudinal flow axis according to the area of the plane between the surface of nozzle contour 216 and the top wall of flow container 210 that is perpendicular to the longitudinal axis and the general vector of fluidic flow 214. Nozzle 220 constricts fluidic flow 214 with nozzle contour 216 in only one dimension to provide an accurate means for testing the effects of a fluidic flow. In other embodiments, nozzle 220 can include any convergent nozzle, divergent nozzle, or combination of convergent and divergent nozzles which accelerate or direct a fluidic flow by constricting the flow. Nozzle 220 has a throat 222 defined as the point along nozzle 220 of greatest constriction, the nozzle opening having the smallest cross sectional area at the throat.

A fluidic flow is provided to the opening through nozzle 220 by an injector 224 that is incorporated with nozzle contour 216 proximate to throat 222. Injector 224 receives pressurized fluid from a duct 226, and provides the pressurized fluid into a flow field 212 through a port formed at the end of injector 224.

FIG. 8 depicts two separate controllers for pulsing the fluid from injector 224 into nozzle 220 at throat 222. A high speed mechanical valve 228 provides periodic modulation of the pressure to injector 224 by rotating a ring 230 with valve openings 232 so that ring 230 periodically blocks flow through duct 226 and periodically allows flow through duct 226 when valve opening 232 corresponds to duct 226. The mechanical valve can provide a square pulse wave form having an amplitude that shifts from zero secondary flow to full secondary flow in a short transition time. FIG. 8 also depicts an acoustic pulse vibrator 234 associated with injector 224. Acoustic pulse vibrator 234 can be any vibrational device that provides modulated energy to duct 226. For instance, a piezoelectric vibrator can provide acoustic energy, similar to the energy produced by a stereo sound system. An acoustic vibrator can produce a wide variety of wave forms. In other embodiments, any effective means of modulating a flow can be used.

Injector 224 provides a pulsed fluidic flow field 212, with the pulse determined by a controller, such as mechanical valve 228 or acoustic pulse vibrator 234.

The controller associated with injector 224 can vary the pulse of the fluidic flow to have a predetermined frequency, amplitude, or wave form. For instance, mechanical valve 228 can vary the frequency of the pulse provided by injector 224 by varying the rate at which ring 230 rotates. In this example, the pulsed fluidic flow produced by injector 224 modulates from no flow when valve openings 232 are completely misaligned with duct 226 to having a full flow equal to the flow through duct 226 when valve openings 232 are completely aligned with duct 226. Mechanical valve 228 can provide a pulsed fluidic flow with varying amplitudes by either varying the pressure available in duct 226 or making valve opening 232 smaller relative to the size of duct 226, thereby reducing the flow to injector 224. Acoustic pulse vibrator 234 can provide a pulsed fluidic flow having a predetermined wave form by creating vibrations with a corresponding wave form along duct 26. For instance, a sinusoidal electrical signal provided to a piezoelectric vibrator could create sinusoidal mechanical energy along duct 226 which can be transmitted to the secondary flow through duct 226.

In operation, a primary fluidic flow 214 passes through flow container 210 towards container exit 218 along flow field 212. The fluidic flow can be any fluid, such as liquids or gases. As fluidic flow 214 passes through throat 222 of nozzle 220, injector 224 injects an unsteady or pulsed fluidic secondary flow across flow field 212. Although FIG. 8 depicts a flow that is generally perpendicular to flow field 212, the flow could be injected at any angle opposed to or with the direction of fluidic flow 214. A pulsed laser 236 provides a laser beam to a mirror 238 which reflects the beam through a lens 240. The refraction of the beam as it passes from lens 240 through the flow 214 allows a visual determination of the effects of the pulsed fluidic flow upon flow 214. Blockage can be determined by measuring the primary fluid mass flow 214 upstream of the test section with a calibrated meter.

Blockage of a primary flow through a nozzle by a secondary flow is related to the extent of penetration of the secondary flow into the primary flow. The penetration of a secondary flow into a primary flow is controlled by the secondary/primary flow momentum flux ratio, which is related to the mass and velocity of the primary and secondary flows, and the change in velocity of the flow as it pulses. The greater the mass and velocity of a secondary flow exiting an injector relative to the mass and velocity of a primary flow passing by the injector, the greater the penetration of the flow into the fluidic flow. Increased penetration of the secondary flow can provide greater blockage of the primary flow through the nozzle, effectively decreasing the cross sectional area of the nozzle opening at the point of penetration.

Penetration of a secondary flow into a primary flow can be enhanced when the flow rate is periodically modulated, or pulsed. Pulsing of an injector's flow rate forms trains of vortex rings with spacing and strength related to the characteristics of the pulse, such as the pulse's frequency, amplitude and wave form. The vortex rings created by the pulsed flow interact with the primary flow to enhance penetration of the flow into the primary flow by increasing the flow's net field momentum flux ratio. When placed proximate to the opening of a nozzle, such as at a nozzle's throat, an injector can increase the blockage of a flow through a nozzle by penetrating the flow, and effectively decreasing the cross sectional area of the opening of the nozzle. The amount of blockage will vary with the magnitude, characteristics, and available frequency of vortex ring production. For instance, low frequency mechanical valves can induce strong perturbations with vortex-ring-induced penetration due to the large shifts in amplitude available from such valves; in contrast, acoustic vibrations can introduce higher frequency pulse wave forms with smaller perturbations but less disruption to secondary flow pressure. Alternatively, a combination of mechanical and acoustic induced vibrations can produce unique primary flow disruption characteristics. Due to the interaction of the vortex rings with the primary flow 214, maximum blockage of nozzle 220 for a given primary flow 214 could occur at frequencies that are different than the frequency that provides greatest penetration into flow 214.

The apparatus depicted in FIG. 8 allows an experimental determination of maximum blockage for a particular nozzle contour with a primary flow and a variety of secondary flows. First, a baseline for the blockage caused by steady-state injection can be determined for a particular primary to secondary flow velocity ratio. An unsteady flow or pulsed flow, meaning a flow modulated over time, can then be injected into the primary flow, with the unsteady or pulsed flow having the same mean flow rate as the steady flow. At proper frequencies, amplitudes and waveforms, pulsed injection of the secondary flow provides enhanced blockage over the blockade provided by steady state injection due to the vortex rings formed as the flow changes over time. The pulsed flow can be tuned by testing different pulsing frequencies, amplitudes and waveforms to achieve maximum blockage for a given mean flow rate of the secondary flow. Thus, a pulsed flow injector can increase fluidic blockage of a primary flow through a nozzle compared to the blockage provided by a steady-state injector because of the periodic modulation of the injectant, the increased blockage being created without a net increase in time-averaged injectant mass flow.

It is important to understand that, as used herein, a pulsed flow is a flow with mass flow characteristics that change periodically over time in a regular or repeated pattern. A pulsed secondary flow can achieve a predetermined blockage of a given primary flow to support flow throttling or vectoring. The periodic changes can be a pulse having a particular frequency, wave form or amplitude that maximizes blockage by maximizing the momentum flux for a given mean flow rate.

In alternative embodiments, an unsteady flow can be used to achieve a predetermined blockage of a given primary flow. As used herein, an unsteady flow means a flow with mass flow characteristics that change over time but that do not necessarily change in a particular or periodic repeated pattern. A pulsed flow is a type of unsteady flow. An unsteady flow can maintain constant blockage of a nozzle opening for a given primary flow because of the vortices created by the change in the mass flow characteristics of the flow even though the change in mass flow characteristics does not follow a repeating pattern. As used herein, an unsteady flow does not mean changes in mass flow characteristics of a flow if the changes are to increase or decrease nozzle blockage for a constant primary flow, or if the changes are to maintain a constant nozzle blockage in response to changes in the mass flow characteristics of the primary flow, as could occur with changing throttle settings for a jet engine having steady secondary flow injection.

FIG. 9 depicts a jet engine configured with a pulsed fluidic secondary flow injector according to the present invention. A primary flow 214 of air enters jet engine 242 through intake 244. Fan section 246, comprised of a plurality of rotating fan blades 248, pushes flow 214 into bypass section 250 and compressor section 252. Compressor section 252 is comprised of a plurality of compressor blades 254 which compress flow 214 into combustion chamber 256. Fuel is mixed with flow 214 in combustion chamber 256 and ignited, thereby adding energy to flow 214, resulting in an increased temperature of flow 214 in combustion chamber 256. Pressure within combustion chamber 256 forces flow 214 into turbine section 258, which is comprised of a plurality of turbine blades 260. Turbine section 258 removes some energy from flow 214 to power compressor section 252 and fan section 246. Flow 214 then passes into exhaust chamber 262 where it combines with the flow from bypass section 250. An afterburner 264 can provide additional fuel which can be ignited to increase the energy of flow 214. Flow 214 is then expelled from engine 242 through exit 66 as an exhaust flow.

Engine 242 creates thrust related to the velocity of the mass and density of the air of flow 214 over a given time period. Typically, in a jet engine, flow 214 is a subsonic flow of air until it reaches throat 270. A nozzle 268 cooperates with exit 266 to accept flow 214 from exhaust chamber 262 and to accelerate exhaust flow 214 to higher velocities, typically supersonic velocities. To achieve optimum acceleration of the exhaust flow, nozzle 268 converges the flow at throat 270, which is the point or section in nozzle 268 having the smallest cross sectional area, the constriction of throat 270 typically accelerating the flow to a sonic velocity, and a supersonic velocity after throat 270. Constriction of the flow at throat 270 operationally translates energy in the flow from pressure and temperature into velocity, thus creating thrust opposite to the vector of flow 214 as flow 214 exits nozzle 268. Although nozzle 268 is depicted as a fixed geometry nozzle, it should be understood that variable geometry nozzles can be incorporated with the present invention to enhance control of the exhaust flow.

An air duct 274 collects high pressure air from flow 214 at compressor section 252 and provides the high pressure air to injector 276. In alternative embodiments, air duct 274 can collect air from bypass sect on 250 combustion chamber 256 or any other portion of engine 242 having high pressure air. In an alternative embodiment, a separate compressor can provide high pressure air to air duct 274. A controller 278 controls the pressurized air in duct 274 to create an unsteady or pulsed secondary flow and to send that secondary flow to injector 276 for injection proximate to nozzle 268. Proximate to nozzle 268, as used herein, means a position that will result in some blockage of nozzle opening 272 by the interaction of the secondary flow from injector 276 and exhaust flow 14 exiting exhaust chamber 262. Air duct 274 can provide compressed air to two or more opposing injectors 276 located on opposite sides of the interior wall of nozzle 268.

In operation, controller 278 can vary the frequency, amplitude, and wave form of the pulsed secondary flow from injector 276 so as to optimize performance of engine 242. For instance, to enhance the acceleration of exhaust flow 214 as it exits from exhaust chamber 262 through exit 266, the effective cross sectional area of nozzle opening 272 can be made smaller. Controller 278 can direct each of opposing injectors 276 to inject a pulsed secondary flow having mass flow and pulse characteristics adequate to effectively decrease the cross sectional area of opening 272 of nozzle 268 to not only ensure proper acceleration of exhaust flow 214, but also to throttle flow 214 to control the pressure and temperature within exhaust chamber 262. If each injector 276 injects a secondary flow with similar characteristics, flow 214 can be accelerated without changing its vector. In one embodiment, a mechanical valve could provide a square pulse waveform with a frequency of between 100 and 1000 hertz. In another embodiment, each injector 276 could be controlled by its own associated controller 278. Controller 278 can include a processor and software to control a nozzle's effective cross sectional area over a range of operating conditions.

When engine 242 is operated at varying power settings, the energy level of flow 14 is varied by, for instance, fluctuation of the amount of fuel in combustion chamber 256. A greater energy level added to flow 214 increases the pressure and temperature in exhaust chamber 262. Typically, jet engines increase the cross sectional area of the nozzle when afterburner is selected. At high flow energy levels, controller 278 can direct injector 276 to provide a secondary flow with decreased blockage to reduce pressure in exhaust chamber 262 by creating a greater effective cross sectional area in opening 272. When the energy level of flow 214 is maximized by providing fuel into exhaust chamber 262 with afterburner 264 the exhaust flow in exhaust chamber 262 can create an over-pressure which can cause a backflow of air through bypass chamber 250 and, in extreme situations, through turbine section 258. To minimize the effects of the backpressure created in exhaust chamber 262 by initiation of afterburner 264, controller 278 can direct injector 276 to provide no or just minimal blockage of nozzle opening 272, thus effectively increasing the cross sectional area of nozzle opening 272. Those skilled in the art will appreciate that the system depicted in FIG. 9 can perform or supplement the functions of a variable geometry nozzle to adjust the effective cross sectional area of a nozzle over a jet engine's full power range.

Figure 10:
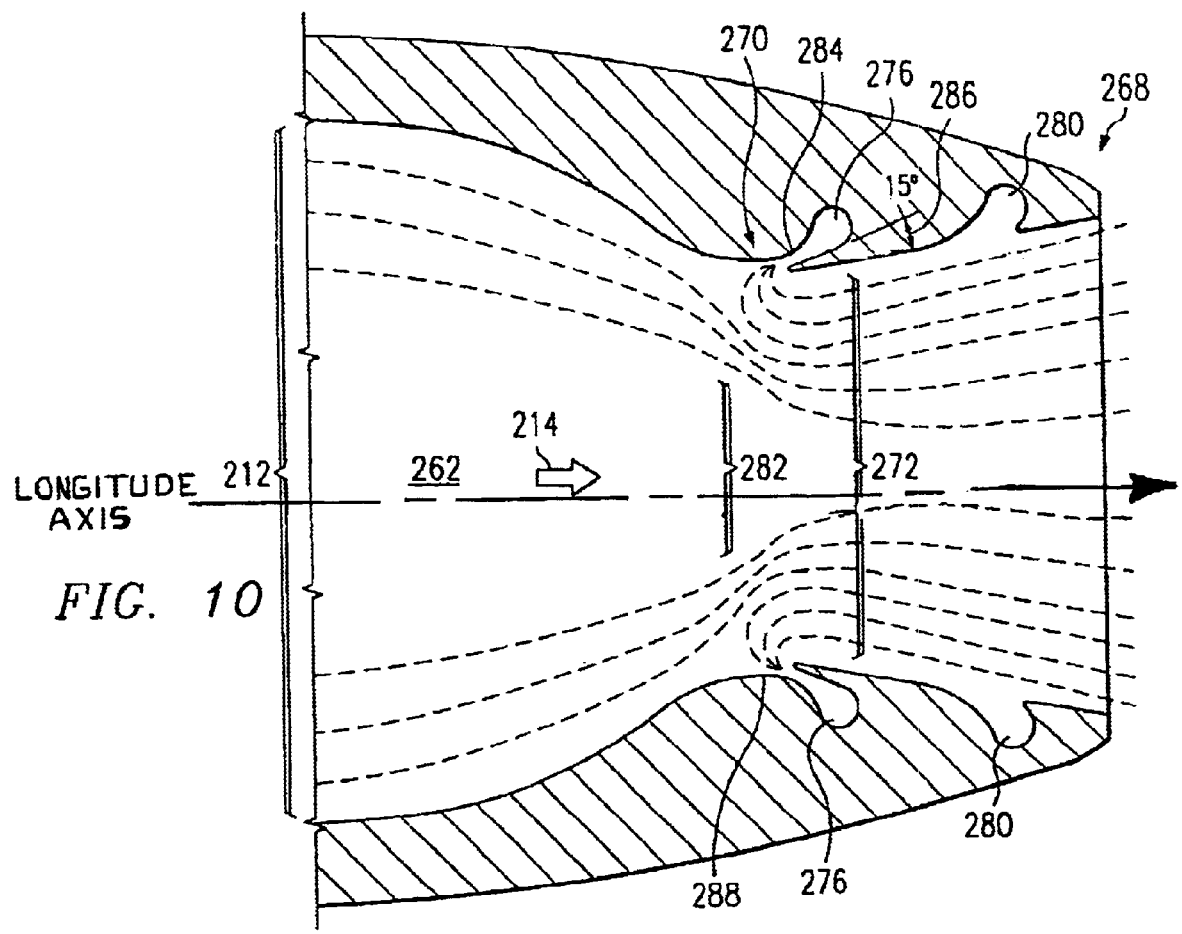
FIG. 10 depicts a side sectional view of injectors incorporated in a nozzle.

FIG. 10 depicts one embodiment of injectors 276 and 277 according to the present invention, and the effect that injectors 276 and 277 can have on flow 214 exiting an exhaust chamber 262 through nozzle opening 272. When injectors 276 and 277 are turned off so that they do not inject a secondary flow, the effective cross sectional area of nozzle opening 272 is defined by the area of the plane generally perpendicular to flow 214 between the walls 280 of nozzle 268. When symmetric and opposed injectors 276 and 277 are provided similar secondary flows 284 and 285 into flow 214, the secondary flows evenly block the nozzle's opening to vary the nozzle's discharge coefficient, which is analogous to effective cross sectional flow area, to decrease the effective cross sectional area of nozzle opening 272 to the area depicted by numeral 282. Thus, nozzle opening 272 depicts an effective cross sectional area that could correlate to an engine in afterburner, and nozzle opening 282 depicts an effective cross sectional area that could correlate to an engine when not afterburning.

Modern jet aircraft typically use variable geometry nozzles to control throat area. In an afterburning turbofan engine, as much as a two-fold increase in throat area can be required to throttle engine operating pressure and control stall margin during afterburner operation. To achieve a minimum possible effective throat area, injector 276 and 277 can include several features in addition to pulsed flow.

First, injector 276 and 277 may provide an airflow with maximum penetration into the primary flow 214. To achieve the best penetration, injector 276 should provide a sonic or supersonic secondary flow 284, such as can be obtained from a choked injector having an expansion area ratio of approximately 1.1. The supersonic velocity of the injected secondary flow should also provide optimal mass flow characteristics. Injectors 276 and 277 should provide a secondary flow with a corrected mass flow parameter and secondary to primary total pressure ratio that are as large as possible to enhance reduction of the nozzle's discharge coefficient. For example, an injected corrected mass flow of 15%, and a total pressure ratio of 2, relative to the primary flow, are estimates of the maximum allowable properties within aircraft system weight and volume design constraints. In one alternative embodiment, the mass flow characteristics could be further enhanced by the addition of ignited fuel or other injectants to the secondary flow.

Next, the orientation and location of injectors 276 and 277 can be arranged to maximize penetration into primary flow 214. Injectors 276 and 277 provide secondary flows 284 and 285 that are at an injection angle 286 from being completely opposed to the direction of primary flow 214 along the longitudinal axis of nozzle 268. FIG. 10 depicts angle of 286 as 15 degrees from the longitudinal axis of nozzle 268, although angles of between zero and 30 degrees will provide enhanced blockage of nozzle opening 272. In one alternative embodiment, the angle 286 of injectors 276 and 277 can be adjusted to a range of values. Injector 276 is located at the beginning of throat 270 so that the secondary flow from injector 276 is aimed into the subsonic portion of the nozzle flow field 212. Injection of the secondary flow into the subsonic portion of the flow field prevents the formation of shocks, which can significantly impact the nozzle's thrust efficiency.

Figure 11:
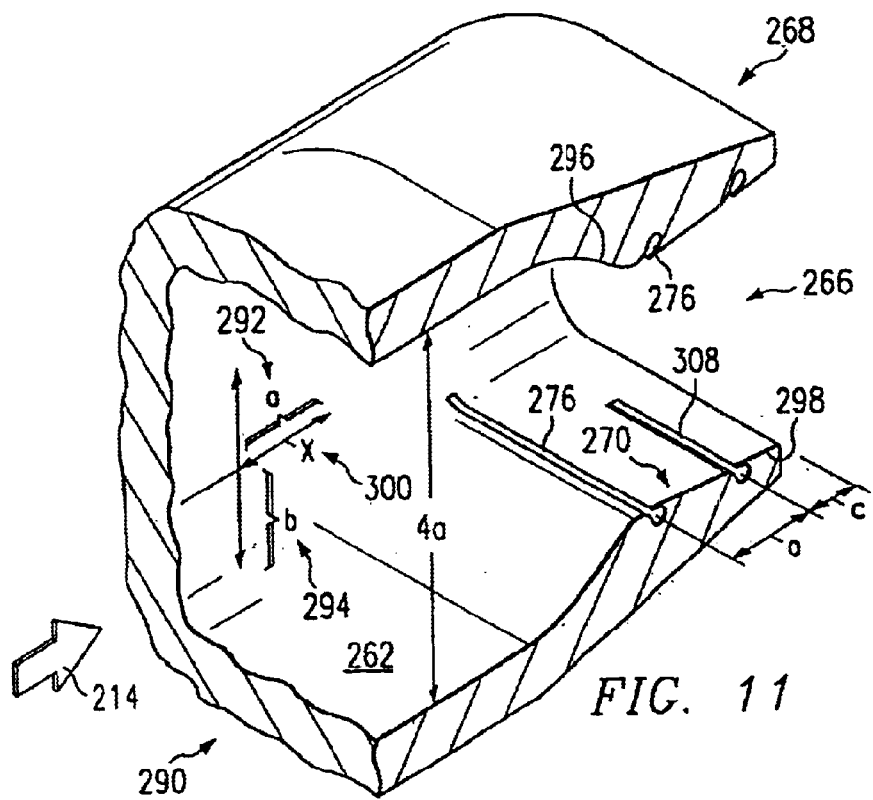
FIG. 11 depicts a perspective sectional view of a nozzle having slot injectors incorporated at its throat.

Finally, injectors 276 and 277 can be incorporated into various nozzle designs so that the nozzle design, injector mass flow characteristics, injector orientation, injector location and the secondary flow pulse characteristics cooperate to provide maximum blockage for a given secondary flow. Referring to FIG. 11, one effective internal nozzle convergence contour is depicted. Exhaust chamber 262 is adapted to accept engine exhaust at an afterburner duct 290, and to provide the exhaust to throat 270. Exhaust chamber 262 has a high discharge, smooth transition contour shape. Although exhaust chamber 262 can have a variety of profiled choked nozzle convergence shapes to enhance the effect of injectors 276, an ellipse shape is depicted in FIG. 11. The ellipse shape has a major axis 292 with vertices along its major axis having a length depicted as a, and a minor axis 94 with a vertices along its minor axis having a length depicted as b. The afterburner duct 290 into exhaust chamber 262 has a diameter proportional to major axis 292, such as four times the distance a. Length b of minor axis 294 establishes the contraction ratio of nozzle 268, meaning the ratio of the areas of afterburner duct 290 and throat 270, and can be set at a value similar to that of the F110-GE-129 turbofan engine's nozzle, such as approximately 1.8.

The ellipse shape of exhaust chamber 262 depicted in FIG. 11 blends into throat 270 with a fillet-radius shaped convergence section 296. Throat 270 has a constant area along a throat length from its intersection with convergence section 296 to its intersection with a divergent section 298, the length being proportional to major axis 292, such as a length of a. The nozzle's discharge coefficient is raised without injection and lowered with injection. Divergent section 298 accepts flow 214 from throat 270 and directs flow 214 along a length c of approximately 12 inches to ensure reattachment of flow 214 to the walls of nozzle 268 before flow 214 is discharged through exit 266. Divergent section 298 has a low degree of expansion, such as an expansion area ratio of 1.1–1.3 where expansion area ratio is defined as the cross sectional area at exit 266 divided by the cross sectional area of throat 270. The low degree of expansion of divergent section 298 reduces the nozzle's discharge coefficient with injection.

Throat 270 can have a number of aperture shapes, including an axisymmetric, rectangular (2-D), elliptical, diamond, triangular shapes, and other low observable RADAR and IR configurations. FIG. 11 depicts a rectangular throat aperture which supports two opposing injectors 276 and 277 formed as slots that encompasses the full periphery of the top and bottom of the rectangular-shaped throat 270. Each injector 276 and 277 can provide a uniform flow along the entire slot from a single duct, or can include a number of smaller injection components within each slot which can cooperate to provide a uniform flow or a flow that varies along the slot. Injectors 276 and 277 are placed within throat 270 proximate to exhaust chamber 262, such as one nozzle throat radius from the nozzle's centroid 300.

Figure 12:
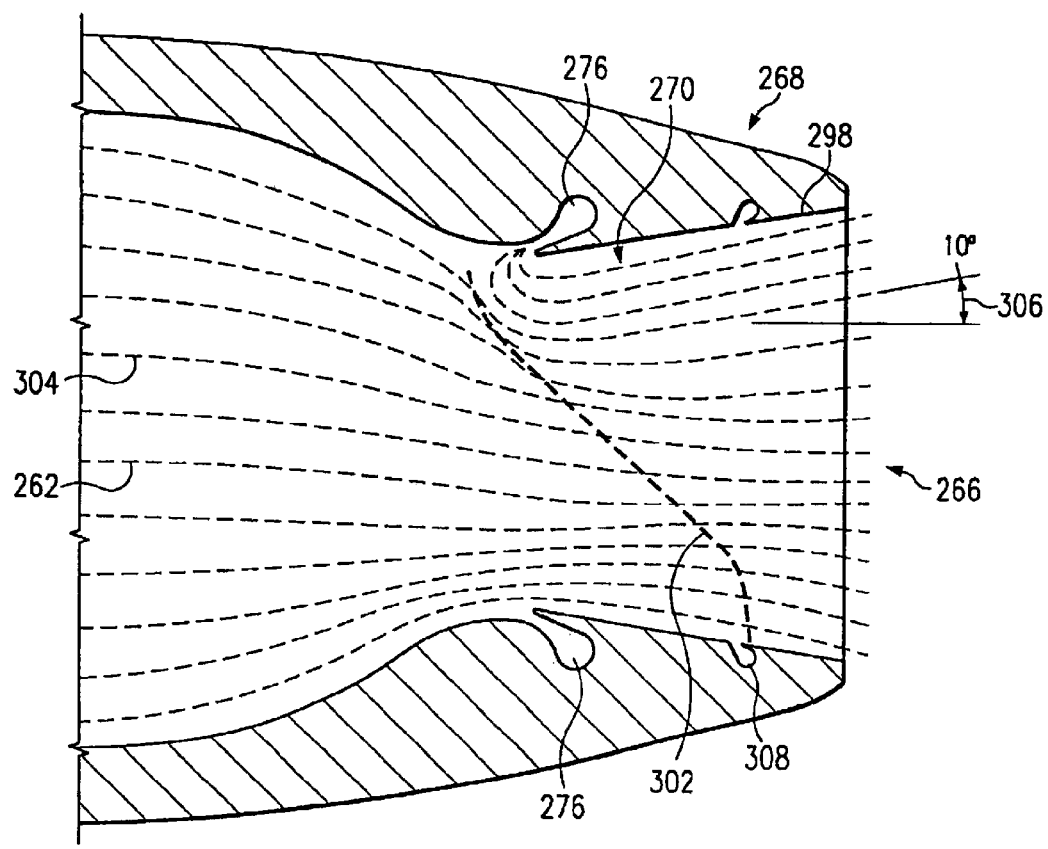
FIG. 12 depicts a side sectional view of a nozzle providing asymmetric injection to vector an exhaust flow.

In operation, exhaust chamber 262 accepts an exhaust flow 214 from a jet engine through afterburner duct 290 and directs flow 214 through throat 270 and divergent section 298 to exit through opening 266. Flow 214 accelerates as it passes through throat 270 to produce thrust opposite the direction of flow 214. The interaction of the high discharge smooth transition contour shape of exhaust chamber 262 with the proportionally-shaped throat allows nozzle 268 to operate at a relatively low pressure within exhaust chamber 262. The relatively low pressure within exhaust chamber 262 allows flow 214 to enter afterburner duct 290 and throat 270 at subsonic speeds, but to accelerate to supersonic speeds as it passes through throat 270 and expands into divergent section 298. Thus, a secondary flow from an injector 276 located proximate to throat 270 will not cause the creation of a shock wave if the secondary flow is directed at flow 214 when it is subsonic. Flow 214 reaches supersonic speeds along a sonic plane 302 which is depicted in FIG. 12, and which occurs after flow 14 passes injectors 276 and 308. Sonic plane 302 divides flow 214 into a subsonic portion proximate to exhaust chamber 262 and a supersonic portion proximate to exit 266.

Referring now to FIG. 12, lines 304 represent the mass flow characteristics of flow 214, passing through nozzle 268. As flow 214 passes through throat 270, the energy of flow 214 is translated from a high pressure and low velocity into a low pressure and high velocity. Injectors 276 and 308 provide a flow that partially blocks throat 270 and thus skews sonic plane 302 of flow 214. When a plurality of injectors provide a symmetrical secondary flow around the periphery of throat 270, the effective cross sectional area of throat 270 is decreased, causing an increase in pressure within exhaust chamber 262 and an increase in the velocity of flow 214 as it accelerates through throat 270. The pressure within afterburner duct can be controlled by controlling the amount of blockage provided by the secondary flow from injectors 276.

When an injectors 276 and 308 provide an asymmetric flow around the periphery of throat 270 into the subsonic flow 214, flow 214 expands more rapidly along the nozzle wall associated with the greater blockage of throat 270, inducing the expanding flow proximate to the greater blockage to reach sonic speeds more rapidly than flow distal to the greater blockage. The ten degree deflection indicated by angle 306 reflects the vectoring of thrust which could result from the introduction of an asymmetric flow at the subsonic portions of flow 214. The asymmetry of the flow can be created by a number of variations to the flow from each injector 276 and 308 including variations to the injection orientation, mass flow characteristics, and pulse frequency, wave form, and amplitude. The asymmetric flow is created because each injector 276 and 308 has defined, localized influence on flow 214, which can be further controlled by separating each injector with sidewalls.

Supplemental injection port 308 enhances thrust vectoring produced by an asymmetric flow from injectors 276 by providing an additional flow to flow 214 aft of sonic plane 302. Port 308 provides an additional flow to skew sonic plane 302 towards port 308, but does not produce a shock wave.

The throttling and vectoring functions of nozzle 268 can be combined to provide a versatile nozzle design for afterburning, low observable or other engines. Total injected mass flow from injectors 276 and 308 can control throttling by providing a proper amount of blockage of nozzle 268 at throat 270. The distribution of the injected mass flow asymmetrically between different injectors provides vectoring for a given throttle setting, with the angle of vector dependent upon the distribution of the injected mass flow. Similarly, variations in pulsing characteristics and injector orientation can provide simultaneous throttling and vectoring of flow 214 with an effective nozzle. In a nozzle having some variable geometry characteristics, variations in the contour and shape of the exhaust chamber, convergence section, throat and divergent section can also enhance vectoring of flow 214.

A nozzle that provides a combination of throttling and vectoring of an exhaust flow from a jet engine can provide many advantages, particularly in high performance tactical aircraft. A fixed nozzle comprised of thermally-optimized materials, as opposed to mechanically-oriented materials, can be incorporated into an aircraft, dramatically decreasing the weight and complexity of the aircraft's propulsion system. The thrust produced by exhaust flow from the aircraft's engine can produce pitch and yaw vectors without the movement of external surfaces, resulting in smaller external surfaces at the tail of the aircraft and an associated reduction in aircraft drag. A fixed nozzle can also be applied to non-circular aperature shapes. Injection of a secondary flow into the subsonic primary flow can produce vectoring and throttling without creating shocks and the thrust losses associated with such shocks.

Although the present invention has been described in detail, it should be understood that various changes, substitutions and alterations can be made hereto without departing from the spirit and scope of the invention as defined by the appended claims.

What is claimed is:

1. A system for vectoring a ducted primary flow through a three-dimensional (3D) small area expansion nozzle by varying a shape, cross-sectional area, or orientation of an effective throat or sonic plane within the ducted primary flow, comprising:

an opening for accepting the primary flow;

at least one primary injector located wherein said at least one injector is inclined to oppose the primary flow up-stream of said effective throat or sonic plane and within a convergent portion of the three-dimensional (3D) small area expansion nozzle;

at least one supplemental injector wherein said at least one supplemental injector is located downstream of the at least one primary injector and within a divergent portion of the 3D small area expansion nozzle, wherein said at least one supplemental injector is inclined to oppose the primary flow, and wherein the at least one primary and supplemental injectors are arranged three-dimensionally and operable to continuously inject fluidic pulses to provide a flow field opposed to a subsonic portion of the primary flow in order to vector the primary flow, wherein the injection of fluidic pulses within the subsonic portion of the primary flow is operable to prevent shock formation; and at least one controller operable to direct said at least one primary and supplemental injector to provide a flow operable to dynamically vary the shape, cross-sectional area, or orientation of the effective throat or sonic plane.

2. The system for vectoring a primary flow of claim 1, further comprising:

a physical throat, within a duct, wherein the physical throat comprises a region of lowest cross-sectional area, in the primary flow.

3. The system for vectoring a primary flow of claim 2 wherein a plurality of primary injectors is located proximate to said physical throat.

4. The system for vectoring a primary flow of claim 3, wherein a plurality of secondary injectors are arranged to inject fluidic pulses to oppose the primary flow and in parallel to the intended vectoring plane.

5. The system for vectoring a primary flow of claim 4 wherein the plurality of primary injectors and the plurality of secondary injectors inject fluidic pulses symmetrically, resulting in a change in a discharge coefficient in the nozzle.

6. The system for vectoring a primary flow of claim 1 wherein injectors inject fluid pulses asymmetrically, to redirect the primary flow along an intended vectoring plane.

7. The system for vectoring a primary flow of claim 1 wherein injected fluidic pulses comprises compressed gas.

8. The system for vectoring a primary flow of claim 1 wherein injected fluidic pulses comprises fuel.

9. The system for vectoring a primary flow of claim 1, wherein the at least one controller is operable to direct said at least one primary injector and/or said at least one supplemental injector to continuously inject fluidic pulses to dynamically vary the shape, cross-sectional area, or orientation of the effective throat or sonic plane.

10. The system of claim 1, wherein a fluidic pulse from said at least one supplemental injector is operable to skew a boundary of the sonic plane of the primary flow towards said at least one supplemental injector.

11. The system of claim 1, wherein the primary flow has a temperature and wherein said pulsed secondary flow throttles the primary flow by decreasing the effective cross sectional area of the effective throat to control said temperature of the primary flow.

12. A system for vectoring a primary flow comprising:
a nozzle having an inner surface and a physical throat, wherein the physical throat comprises a region within the nozzle of lowest cross-sectional area, the physical throat being situated in a path of the primary flow of fluid;
a plurality of primary and secondary injectors arranged three-dimensionally along the inner surface of the nozzle, the plurality of injectors arranged to oppose the primary flow of fluid in a first intended vectoring plane, and wherein said primary injectors are operable to continuously inject fluidic pulses to dynamically vary the shape, cross-sectional area, or orientation of an effective throat or sonic plane within said nozzle; and
at least one controller operable to direct said plurality of primary and supplemental injectors to provide a dynamic flow operable to dynamically vary the shape, cross-sectional area, or orientation of the effective throat or sonic plane.

13. The system for vectoring a primary flow of claim 12 wherein the plurality of injectors is located proximate to the physical throat.

14. The system for vectoring a primary flow of claim 13, further comprising:
a plurality of supplemental injectors located downstream of the physical throat and arranged along the inner surface of the nozzle, to oppose the primary flow in a second intended vectoring plane.

15. The system for vectoring a primary flow of claim 14 wherein the plurality of primary and supplemental injectors inject fluidic pulses asymmetrically, resulting in a change in a thrust vector associated with the primary flow of the fluid, the change in the thrust vector lying within the first and/or second intended vectoring plane.

16. The system for vectoring a primary flow of claim 14, wherein said supplemental injectors are located proximate to the throat.

17. The system for vectoring a primary flow of claim 16 wherein the plurality of primary and/or supplemental injectors inject fluidic pulses symmetrically, resulting in a change in a discharge coefficient for the nozzle.

18. The system for vectoring a primary flow of claim 14, wherein the at least one controller is operable to direct said at least one primary injector and/or said at least one supplemental injector to continuously inject fluidic pulses to dynamically vary the shape, cross-sectional area, or orientation of the effective throat or sonic plane.

19. The system for vectoring a primary flow of claim 12 wherein the injected fluidic pulses comprises compressed gas.

20. The system for vectoring a primary flow of claim 12 wherein the injected fluidic pulses comprises fuel.

21. A system for vectoring a primary flow in three dimensions by varying an effective throat or sonic plane within a ducted primary flow, comprising:
a convergent portion of a nozzle operable to accept the primary flow;
at least one primary injector located wherein said at least one injector is inclined to oppose the primary flow up-stream of said effective throat or sonic plane;
at least one supplemental injector and wherein said at least one supplemental injector is located downstream of the at least one primary injector, wherein said at least one supplemental injector opposes the primary flow in the intended vectoring plane, wherein said injector opposes the primary flow and wherein the at least one primary and supplemental injectors are arranged three-dimensionally to provide a flow field comprising fluidic pulses and opposed to a subsonic portion of the primary flow in order to vector the primary flow; and
at least one controller operable to direct said at least one primary and supplemental injector operable to provide a dynamic continuous flow operable to vary the effective throat or sonic plane.

22. A control system for vectoring a primary flow within a three-dimensional small area expansion ratio nozzle by varying an effective throat of the three-dimensional small area expansion ratio nozzle, comprising:
an opening for accepting the primary flow;
a smooth converging portion of the nozzle wherein the primary flow is at a subsonic velocity;
a throat coupling said converging portion to a diverging portion of the three-dimensional nozzle downstream of said throat;
a plurality of primary injectors located proximate to the throat wherein the plurality of primary injectors are inclined to oppose the primary flow;
a plurality of supplemental injectors wherein the plurality of supplemental injectors are located in the three-dimensional nozzle downstream of the plurality of primary injectors, wherein the plurality of supplemental injectors are inclined to oppose the primary flow, and wherein the plurality of primary and supplemental injectors are arranged three-dimensionally to inject fluidic pulses to provide a cross flow field opposed to a subsonic portion of the primary flow in order to vary a shape, cross-sectional area, or orientation of an effective throat within the three-dimensional nozzle; and
at least one controller operable to direct said plurality of primary and supplemental injector to provide a pulsed cross flow operable to vary the effective throat within the three-dimensional nozzle.

23. A control system for vectoring an exhaust flow within a three-dimensional small area expansion ratio nozzle of a jet engine by varying an effective throat of the three-dimensional small area expansion ratio nozzle, comprising:
an opening for accepting the primary flow;
a smooth converging portion of the nozzle wherein the primary flow is at a subsonic velocity;
a throat coupling said converging portion to a diverging portion of the three-dimensional nozzle downstream of said throat;
a plurality of primary injectors located proximate to the throat wherein the plurality of primary injectors are inclined to oppose the primary flow;
a plurality of supplemental injectors wherein the plurality of supplemental injectors are located in the three-dimensional nozzle downstream of the plurality of primary injectors, wherein the plurality of supplemental injectors are inclined to oppose the primary flow, and wherein the plurality of primary and supplemental injectors are arranged three-dimensionally to provide a cross flow field opposed to a subsonic portion of the primary flow in order to vary an effective throat within the three-dimensional nozzle; and at least one controller operable to direct said plurality of primary and supplemental injector to provide a pulsed cross flow operable to vary the effective throat within the three-dimensional nozzle.

24. A three-dimensional (3D) small area expansion nozzle operable to dynamically control a direction and magnitude of a primary flow by varying a shape, cross-sectional area, or orientation of an effective throat or sonic plane within the 3D small area expansion nozzle, comprising:
- a convergent portion of the 3D small area expansion nozzle operable to accept the primary flow;
- a physical throat of the 3D small area expansion nozzle downstream of the convergent portion;
- a divergent portion of the 3D small area expansion nozzle downstream of the physical throat;
- at least one 3D array of primary injectors inclined to oppose the primary flow up-stream of the effective throat or sonic plane and located within a surface of the convergent portion of the 3D small area expansion nozzle, wherein the at least one 3D array of primary injectors is operable to continuously inject varying fluidic pulses; and
- at least one 3D array of secondary injectors inclined to oppose the primary flow up-stream of the effective throat or sonic plane and located within a divergent portion of the 3D small area expansion nozzle, wherein the at least one 3D array of primary injectors is operable to continuously inject varying fluidic pulses, and wherein the varying fluid pulses are operable to vary a shape, cross-sectional area, or orientation of the effective throat or sonic plane within the 3D small area expansion nozzle, and wherein the injection of fluidic pulses within the primary flow is operable to prevent shock formation.

25. A three-dimensional (3D) small area expansion nozzle operable to dynamically control a direction and magnitude of a primary flow by varying a shape, cross-sectional area, or orientation of an effective throat or sonic plane within the 3D small area expansion nozzle, comprising:
- a convergent portion of the 3D small area expansion nozzle operable to accept the primary flow;
- a physical throat of the 3D small area expansion nozzle downstream of the convergent portion operable to accept the primary flow;
- a divergent portion of the 3D small area expansion nozzle downstream of the physical throat operable to accept the primary flow;
- at least one 3D array of primary injectors inclined to oppose the primary flow up-stream of the effective throat or sonic plane and located within a surface of the convergent portion of the 3D small area expansion nozzle, wherein the at least one 3D array of primary injectors is operable to continuously inject varying fluidic pulses, and wherein the at least one 3D array of primary injectors is operably coupled to a control system; and
- at least one 3D array of secondary injectors inclined to oppose the primary flow up-stream of the effective throat or sonic plane and located within a divergent portion of the 3D small area expansion nozzle, wherein the at least one 3D array of primary injectors is operable to continuously inject varying fluidic pulses, and wherein the varying fluid pulses are operable to vary a shape, cross-sectional area, or orientation of the effective throat or sonic plane within the 3D small area expansion nozzle, and wherein the injection of fluidic pulses within the primary flow is operable to prevent shock formation, and wherein the at least one 3D array of primary injectors is operably coupled to a control system operable to direct vectoring of the primary flow.

* * * * *